(12) United States Patent
Fuller et al.

(10) Patent No.: US 10,884,689 B2
(45) Date of Patent: Jan. 5, 2021

(54) STATE-BASED AUXILIARY DISPLAY OPERATION

(71) Applicant: MICROSOFT TECHNOLOGY LICENSING, LLC, Redmond, WA (US)

(72) Inventors: Andrew J. Fuller, Redmond, WA (US); Niels Van Dongen, Seattle, WA (US); Michael George Lenahan, Walnut Creek, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/388,423

(22) Filed: Apr. 18, 2019

(65) Prior Publication Data

US 2019/0310816 A1 Oct. 10, 2019

Related U.S. Application Data

(63) Continuation of application No. 15/814,699, filed on Nov. 16, 2017, now Pat. No. 10,275,201, which is a continuation of application No. 15/195,023, filed on Jun. 28, 2016, now Pat. No. 9,870,187, which is a continuation of application No. 14/721,134, filed on
(Continued)

(51) Int. Cl.
*G06F 3/14* (2006.01)
*G06F 1/16* (2006.01)
*G06F 11/32* (2006.01)
*G06F 3/03* (2006.01)
(Continued)

(52) U.S. Cl.
CPC .............. *G06F 3/14* (2013.01); *G06F 1/1601* (2013.01); *G06F 1/162* (2013.01); *G06F 1/165* (2013.01); *G06F 1/169* (2013.01); *G06F 1/1616* (2013.01); *G06F 1/1626* (2013.01); *G06F 1/1654* (2013.01); *G06F 1/1677* (2013.01); *G06F 3/03* (2013.01); *G06F 11/328* (2013.01); *G06F 3/1423* (2013.01); *G06F 2200/1612* (2013.01); *G06F 2203/0384* (2013.01); *G09G 5/003* (2013.01); *G09G 2370/04* (2013.01); *H04M 1/7253* (2013.01)

(58) Field of Classification Search
None
See application file for complete search history.

(56) References Cited

U.S. PATENT DOCUMENTS

| | | | |
|---|---|---|---|
| 6,970,696 B1 * | 11/2005 | Fuoss ...................... | H04W 4/16 379/211.01 |
| 2004/0088452 A1 * | 5/2004 | Scott ..................... | G06F 1/1632 710/62 |
| 2006/0066573 A1 * | 3/2006 | Matsumoto ........... | G06F 3/0236 345/158 |

* cited by examiner

*Primary Examiner* — Scott C Sun
(74) *Attorney, Agent, or Firm* — Workman Nydegger (57) ABSTRACT

Described is a technology by which routing of data may be automatically modified based on detected state data of a computing system. For example, user input may be routed from an actuator set to a host computer system when the host computer system is in an online state, or to an auxiliary computing device when the host computer system is offline. State may be determined based on one or more various criteria, such as online or offline, laptop lid position, display orientation, current communication and/or other criteria. The auxiliary display and/or actuator set may be embedded in the host computer system, or each may be separable from it or standalone, such as a remote control or cellular phone.

20 Claims, 10 Drawing Sheets

Related U.S. Application Data

May 26, 2015, now Pat. No. 9,383,830, which is a continuation of application No. 14/600,209, filed on Jan. 20, 2015, now Pat. No. 9,063,584, which is a continuation of application No. 14/244,272, filed on Apr. 3, 2014, now Pat. No. 8,959,259, which is a continuation of application No. 11/366,682, filed on Mar. 2, 2006, now Pat. No. 8,692,816.

(60) Provisional application No. 60/674,203, filed on Apr. 22, 2005, provisional application No. 60/674,204, filed on Apr. 22, 2005.

(51) Int. Cl.
*H04M 1/725* (2006.01)
*G09G 5/00* (2006.01)

STATE-BASED AUXILIARY DISPLAY OPERATION

CROSS-REFERENCE TO RELATED APPLICATIONS

This application is a continuation of U.S. patent application Ser. No. 15/814,699 filed on Nov. 16, 2017, entitled "STATE-BASED AUXILIARY DISPLAY OPERATION," which is a continuation of U.S. patent application Ser. No. 15/195,023 filed on Jun. 28, 2016, entitled "STATE-BASED AUXILIARY DISPLAY OPERATION," which issued as U.S. Pat. No. 9,870,187 on Jan. 16, 2018, which is a continuation of U.S. patent application Ser. No. 14/721,134 filed on May 26, 2015, entitled "STATE-BASED AUXILIARY DISPLAY OPERATION," which issued as U.S. Pat. No. 9,383,830 on Jul. 5, 2016, which is a continuation of U.S. patent application Ser. No. 14/600,209 filed on Jan. 20, 2015, entitled "STATE-BASED AUXILIARY DISPLAY OPERATION," which issued as U.S. Pat. No. 9,063,584 on Jun. 23, 2015, which is a continuation of U.S. patent application Ser. No. 14/244,272 filed on Apr. 3, 2014, entitled "STATE-BASED AUXILIARY DISPLAY OPERATION," which issued as U.S. Pat. No. 8,959,259 on Feb. 17, 2015, which is a continuation of U.S. patent application Ser. No. 11/366,682 filed on Mar. 2, 2006, entitled "STATE-BASED AUXILIARY DISPLAY OPERATION," which issued as U.S. Pat. No. 8,692,816 on Apr. 8, 2014, which claims the benefit of U.S. Provisional Patent Application No. 60/674,203 filed on Apr. 22, 2005 and U.S. Provisional Patent Application No. 60/674,204 filed on Apr. 22, 2005. This application expressly incorporates herein the entirety of each of the foregoing applications.

BACKGROUND

The concept of auxiliary processing and auxiliary mechanisms that provide some auxiliary computing functionality to a main (host) computer system are generally described in a number of U.S. patent applications assigned to the assignee of the present invention, including Ser. Nos. 10/429,930 and 10/429,932. In general, many of these auxiliary computing concepts are embodied in various types of auxiliary displays, sometimes comprising a small display device embedded in a personal computer form factor, but also embodied in many other devices such as mobile phones, remote control devices, and so forth. Auxiliary displays can show independent data, e.g., related to another purpose such as mobile phone data, or show-computer-related data, such as email and calendar appointments of a host personal computer, even when the host computer system (e.g., a personal computer) is off or in some other reduced-power state.

To allow a user to interact with/navigate the content displayed on an auxiliary display device, some set of one or more actuators is required. Consideration needs to be given as to how a user will interact with the actuator set, what should occur when the user does, and what the display is currently rendering. For example, if interacting with an auxiliary display embedded in a laptop computer, the actuators generally need to be positioned somewhere proximate the auxiliary display so that users can intuitively use them, including when the laptop lid is closed.

BRIEF SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards modifying the operation of an actuator set and/or an auxiliary computing device that are capable of being coupled to a host computer system based on detected state data. For example, input may be routed from the actuator set to the auxiliary computing device when the host computer system is in an offline (e.g., reduced power, such as off, asleep or possibly in a screen saver mode) state, or may be routed to the host computer system when the host computer system is in an online state. State may be determined based on one or more various criteria, such as a laptop lid position, an orientation of a display, a manual override, a currently executing program, communication between the host computer system and auxiliary computing device, and so forth.

By having host computer system and an auxiliary device, an actuator set may be configured for coupling to the host computer to enable interaction with the host computer when the host computer is capable of receiving data corresponding to input signals received via the actuator set. Alternatively, the actuator set may be configured for coupling to the auxiliary device to enable interaction with the auxiliary device when the auxiliary device is capable of receiving data corresponding to input signals received via the actuator set. By detecting state data including state data related to communication capability between an auxiliary device and a host computer system, the operation of the auxiliary device, e.g., its display, and/or interactivity of an actuator set, may be controlled based on the state data.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION OF THE PREFERRED EMBODIMENTS

Exemplary Operating Environment

Figure 1:
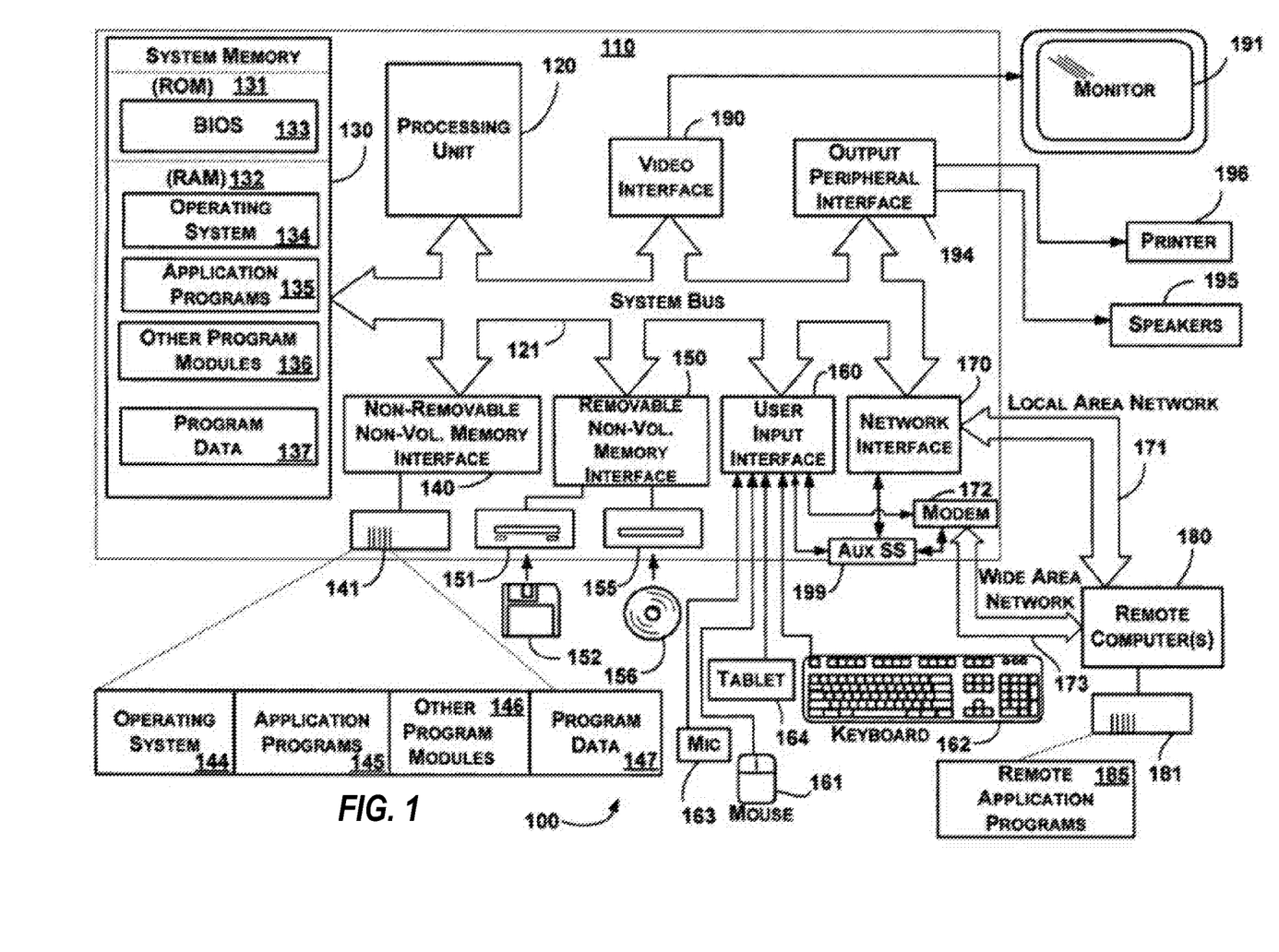
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

An auxiliary display subsystem 199 may be connected via the user interface 160 to allow data such as program content, system status and event notifications to be provided to the user, even if the main portions of the computer system are in a low power state. The auxiliary display subsystem 199 may be connected to the modem 172 and/or network interface 170 to allow communication between these systems while the main processing unit 120 is in a low power state.
State-Based Auxiliary Device Operation Various aspects of the technology described herein are directed towards automatically changing auxiliary device operation based on one or more current state settings, including handling the input from a set of actuators to work in one of a plurality ways depending on a current state. For example, given a host computer system in the form of a laptop with an integrated auxiliary display, the actuators input may be routed to the host computer's operating system when the laptop lid is open, and routed to the auxiliary display device when the laptop lid is closed. In general, some of the description herein is directed towards such a particular example. However, numerous other types of configurations and arrangements are feasible, including one in which a user manually selects where an actuators input is directed.

Another example includes a mobile phone that changes its operation depending on whether and how the mobile phone is currently communicating with a radio tower, with a host computer and/or during a phone call. Yet another example is generally directed towards a detachable and/or standalone device such as a remote control device having actuators that operate in one way when physically coupled (docked) to a host computer system, another way when coupled wirelessly coupled, and yet another way when coupled to a media device. For example, a remote control may produce a signal that is detected by the host computer system and enters the host computer system into a media consumption mode (e.g., to play a movie). Connections qualify as a state as well, whether wired or wireless, such as headphones plugged in or not plugged in (or communicating if wireless).

Moreover, while an auxiliary display device may be of the type that is coupled to a host computer system by being physically built into the housing, e.g., in a laptop, other types of auxiliary devices and actuators may similarly leverage the technology described herein, including devices not conventionally thought of as being "computer-system" peripherals. Such devices include television sets, audio receivers, audio/video recorders, telephones, a separate computer, a mobile communications device, a secondary display screen with actuators, a watch, a wall (e.g., kitchen) display, a display screen, a digital picture frame, a clock, a radio, a media player, a device embedded within or using the main display of a consumer electronics device, automotive, transportation or other vehicular units, keyboards or other input devices of the main computer system, a pager, a personal digital assistant, and so forth. As such, the present invention is not limited to the examples, structures or functionality described herein; rather, any of the examples, structures or functionality described herein are non-limiting, and the present invention may be used various ways that provide benefits and advantages in computing and device usage in general.

Figure 2:
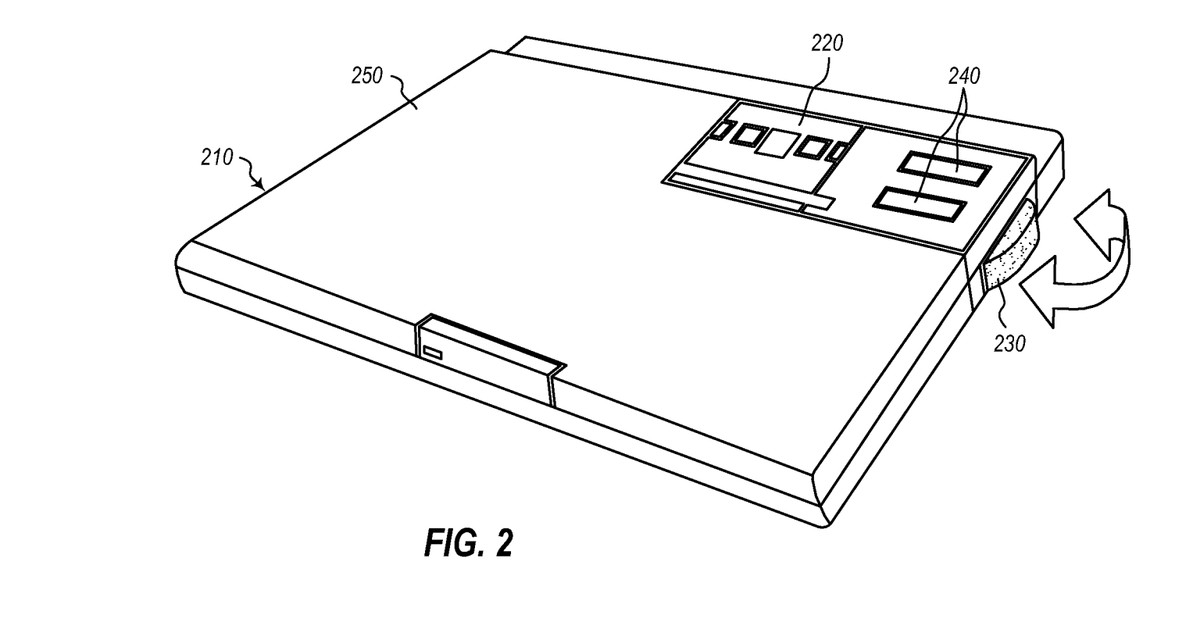
FIG. 2 is a representation of a laptop host computer system having a multiple-use actuator that provides interaction functionality with the host computer and with an auxiliary display coupled to the host computer system.

Turning to FIG. 2 of the drawings, there is shown an example design for a laptop-style host computer system 210 (or the like, such as a tablet-based personal computer), having a design that reduces the overall number of actuators. As can be readily appreciated, the host computer system 210 and embedded auxiliary display 220 may be based on the computer system 110 represented in FIG. 1, with the auxiliary display 220 of FIG. 2 being a component of the auxiliary subsystem 199 of FIG. 1.

To simplify the main computer system 210 for various reasons, including aesthetics, ease of use and to have a reduced number of components and wiring that lower the cost, a set of one or more actuators 230 may be provided that have multiple uses. For example, one such actuator set 230 may be used for operating system/application program interaction (e.g., navigation) when the host computer system is online, (that is, the operating system, e.g., Microsoft Windows® is running), and for alternatively interacting with programs/pages of the auxiliary display when the main computer system is offline (that is, the operating system not fully operational, typically because of a reduced power state). In other words, when online the operating system can be considered as being in control of the actuator set 230, while when offline the auxiliary display can be considered as being in control of the actuator set 230. Note that when online, the input of the actuator set 230 may be provided to the host computer operating system, but routed for user interaction with other programs that are running, e.g., the operating system provides the input or related data that corresponds to the input an application program having focus, (or even to an auxiliary device program).

In the example implementation of FIG. 2, the actuator set 230 comprises a jog dial control that is used as a dual-function interaction/navigation mechanism; (the curved arrow to the right of the arrow jog dial control 230 is to indicate the primary directions of movement, and is of course not part of the system). Such a jog dial control is mounted such that it is accessible whether the laptop lid 250 is open or closed, whereby its multiple-use capabilities are readily apparent. Note that while a jog dial control 230 is represented, such an interaction/navigation mechanism may comprise any set of actuators (e.g., a D-pad, joystick, scroll wheel and so forth), as long as it is placed in such a way that it is reasonably accessible for auxiliary display navigation and for use by the host system 210 when the main computer system's operating system is running, or can be adjusted to be accessible (optimally) for either use mode.

As can be readily appreciated, changing the actuator input based on online or offline state is only one possible mode of operation, and other modes are also possible. For example, the host computer system 210 may be online, but may be placed in a state (e.g., by a user or process) in which the actuator set 230 is configured for direct or indirect interaction with the auxiliary display 220.

Note that other actuators 240 may be present that are not ordinarily shared between the host computer system 210 and the auxiliary display 220. For example, the actuators 240 in FIG. 2 are typically for auxiliary display navigation, as they are built into the laptop lid 250 and thus not readily accessible for ordinary use when the laptop lid 250 is open.

As mentioned above, the present invention is quite applicable to tablet-based personal computers, as such devices typically have a set of navigation controls similar to an auxiliary display device's controls. Such controls may be multiple-purpose controls, as described above. For example, as also mentioned above, in the main computer online state, the user, process or some other state change mechanism may enable a toggle feature that selects whether the actuator set is controlling (interacting with) the host computer system 210 or the auxiliary display 220. This may be relevant for situations in which a user wants to navigate the auxiliary display's user interface while the operating system is still running; for example, using a convertible tablet-based computer, a user can rotate the display so it is facing other people in a meeting, such as to show a presentation (e.g., Microsoft® PowerPoint®) deck, with the user controlling the presentation (e.g., selecting the next slide) from the auxiliary display on the back of the screen. Note that the orientation of the main display and/or the application program that is running can be detected as a current state that changes operation of the auxiliary device display and/or an actuator set.

Figure 3:
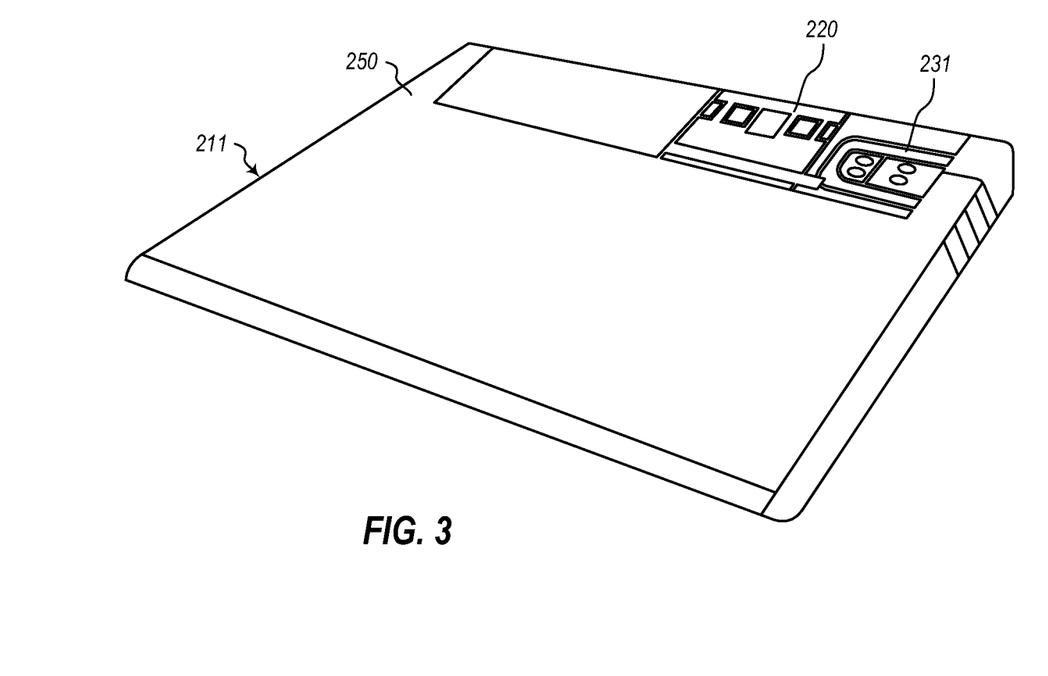
FIG. 3 is a representation of a laptop host computer system having a multiple-use actuator that may provide interaction functionality with the auxiliary display when the laptop lid is closed.
Figure 4:
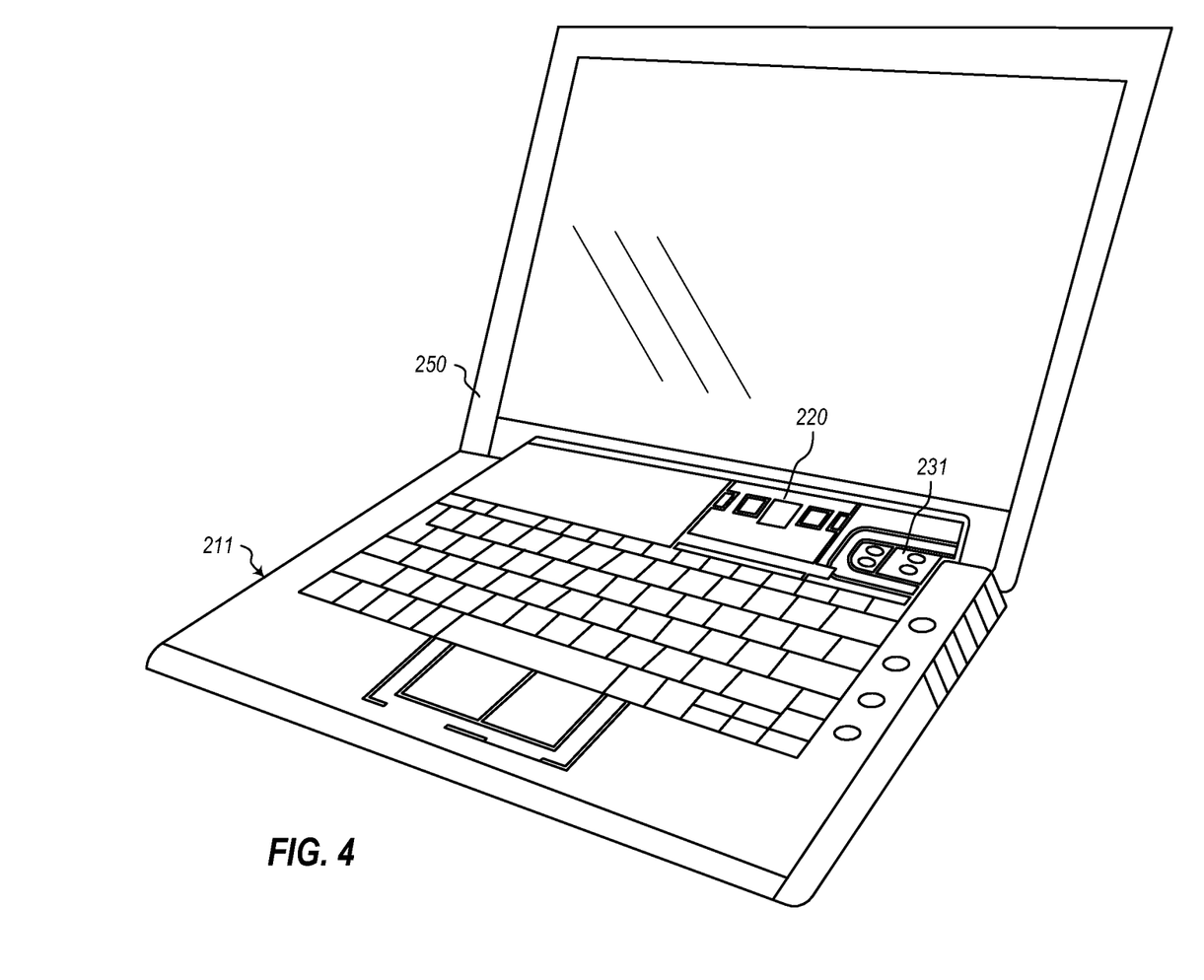
FIG. 4 is a representation of a laptop host computer system having a multiple-use actuator that may provide interaction functionality with the host computer operating system when the laptop lid is open.

Various alternatives for providing an actuator set may be provided, as generally represented with reference to FIGS. 3 and 4. FIGS. 3 and 4 generally show a laptop host computer system 211 configured such that the same auxiliary display 220 and actuator set 231 (such as generally in the form of a D-pad switch) may be used whether the lid is closed (FIG. 3) or open (FIG. 4). Note that a jog dial control 230 is not shown, but may be present, as may any other types of actuators. As can be readily appreciated, the laptop lid position, which often (but not necessarily) corresponds to an offline state (closed) and an online state (open), may be sensed independently or in conjunction with the offline/online for purposes of determining operation of the auxiliary device, i.e., its display and/or actuator set.

Figure 5:
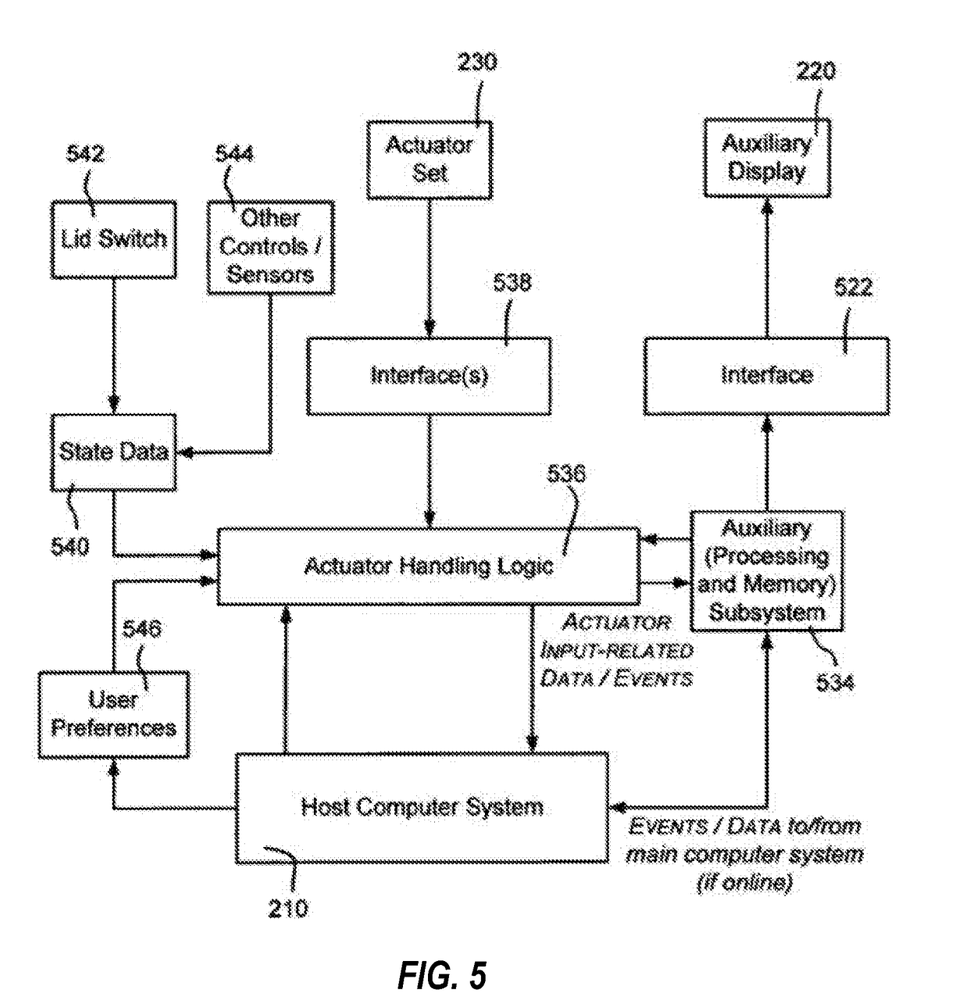
FIG. 5 is a block diagram generally representing components for handling input from the actuator set based on a state of the host computer system.

FIG. 5 is a block diagram representing some example components that may be used to implement various aspects of the present invention. As represented in the example of FIG. 5, an auxiliary display 220 couples via an interface 522 to an auxiliary subsystem 534, generally comprising processing and memory components. In general, the auxiliary subsystem 534 allows the auxiliary display 220 to operate while the main host computer system 210 is offline, and may also communicate with the main host computer system 210 while online.

As also represented in FIG. 5, the actuator set 230 couples to actuator handling logic 536 via one or more suitable interfaces (e.g., a driver) 538. When the host computer system 210 is online, the actuator handling logic 536 can communicate (e.g., via events) with the host computer system 210, primarily to provide information corresponding to actuator input data to the host computer system 210, such as to its operating system. Note that alternatively, actuator input-related data may be fed to the host computer system 210 through the auxiliary subsystem 534, which is generally already configured to provide events to the host computer system 210.

When online, the host computer system 210 can send data (e.g., configured as structured or interlinked pages pages or the like) to the auxiliary subsystem 534 for rendering on the auxiliary display 220. In this manner, the host computer system 210 can control the output of the auxiliary display 220 in response to events received, including events that correspond to interaction with the actuator set 230. Note that the host computer system 210 also may control the output of the auxiliary display 220 in response to other events and other user input, e.g., conventional keyboard and mouse input, received emails, calendar events, phone (caller-ID) events, other state changes such as loss of network connectivity, power state change and so forth.

When online, the host computer system 210 can also instruct the actuator handling logic 536 to be used to control the operation of the auxiliary display 220 independent of the host computer system 210, e.g., as if the host computer system 210 was offline, until otherwise instructed. Other state data 540 can also be used for this purpose, e.g., a lid switch 542 can provide its state, as well as other controls and sensors 544, such as one that indicates whether a tablet PC screen is in a rotated state, and so forth. Note that the state data 540 may include information as to whether the host computer system 210 is in a screen saver or display-power-down mode, (which may be considered a form of being offline), and/or what program is currently being run; for example, the auxiliary display subsystem 534 may behave differently when a presentation program is being run with respect to when another program is run. Still other possible state data includes proximity sensing, when a device (e.g., Bluetooth®) is in out of range, the availability of one or more other communication mechanisms (e.g., GSM, radio, Bluetooth®, WiFi), time-of-day, whether a phone call is detected, and so forth.

User preferences 546, e.g., comprising rules, defaults, and/or other information, also may be a factor in determining operation of the auxiliary device, including whether and how to route input from the actuator set 230. Such preference data 546 or a subset thereof may be configured or overridden by the host computer system 210 when online, and may be maintained in the auxiliary processing and memory subsystem 534 so that it is available for offline use.

Essentially any piece or combination of state data 540, and user preferences/overrides 546 can be used to determine whether the host computer system 210 or the auxiliary processing and memory subsystem 534 controls what content is displayed, and how the auxiliary handling logic 536 operates to route actuator set input.

When the host computer system is offline, or otherwise acts as such with respect to input from the actuator set 230, the auxiliary subsystem 534 directly controls the content displayed on the auxiliary display 220. This may be accomplished in various ways, such as by having the actuator handling logic provide interaction (navigation) events to an auxiliary program (e.g., operating system) running on the auxiliary subsystem 534 (instead of to the main computer system 210, or to both, with the main computer system simply not handling the events). Note that the auxiliary subsystem 534 is available for use because offline content may cached in an auxiliary memory, and because the auxiliary processor, memory and actuator handling logic 534 have power maintained thereto, whereby the actuator handling logic 534 has the ability to generate events to a running auxiliary program even when the host computer system 210 is powered down to some extent. As can be readily appreciated, other various state data 540 as evaluated against user preferences 546 or the like may control or override operation, e.g., a system may be configured to not use the auxiliary display 220 when power is critically low.

As can be readily appreciated, various ways to handle input data may be alternatively implemented. For example, instead of actuator handling logic 536, the actuator set 230 can be coupled (via one or more interfaces) to both to the host computer system 210 and to the auxiliary subsystem 534. When the host computer system 210 is online, the auxiliary processing subsystem 534 can ignore user interaction events received from the actuator set 230, essentially deferring to the host computer system 210, which can route them back as desired. When offline, the auxiliary processing subsystem 534 accepts the user interaction events and operates based on them, with the host computer system 210 not being operational to handle such events, thereby precluding conflicts.

Figure 6A:
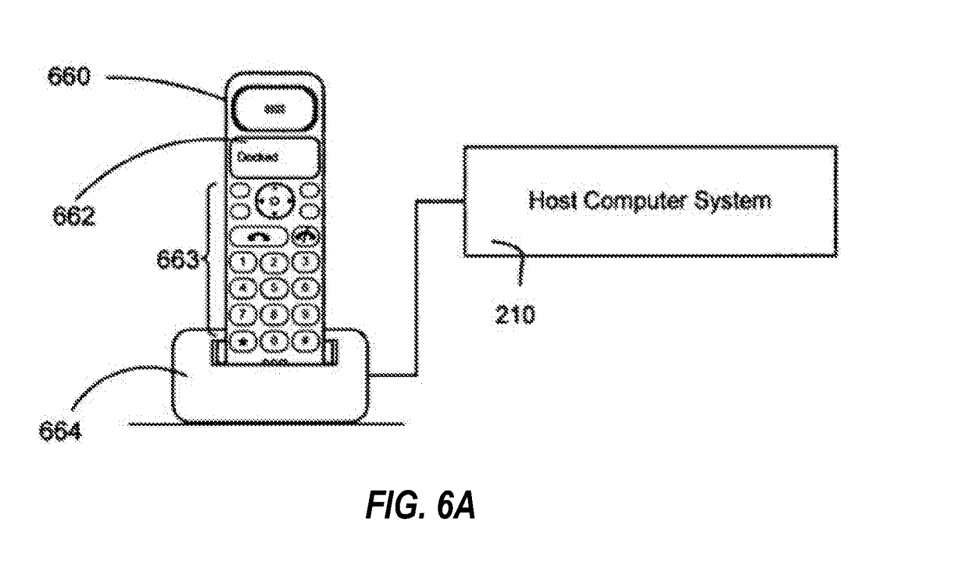
FIGS. 6A-6D are representations of a mobile telephone that changes auxiliary display and/or actuator functionality based on a communication state of the mobile telephone.

FIGS. 6A-6D exemplify another type of state-based change, namely changing actuator set and/or auxiliary display device operation based on current connectivity with a host computer 210 and/or other receiver. For example, FIG. 6A shows connectivity via an auxiliary display device in the form of a mobile phone 660 having a display 662 physically docked to a base 664 coupled in some way (wired or wireless) to the host computer system 210. In such a docked mode, the display 662 and actuator set 663, (or some part of each or both), as well as one or more programs (e.g., synchronization-related programs), may operate in a corresponding mode, e.g., according to this state and user preferences.

Figure 6B:
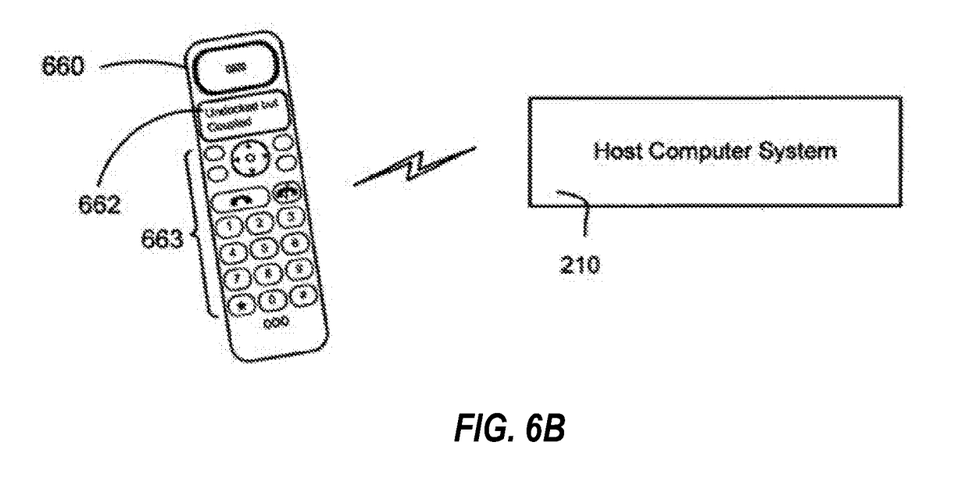

FIG. 6B represents an undocked mode, in which the mobile telephone 660 is still (e.g., wirelessly) coupled and communicating with the host computer system 210. In this state, the actuator set 663 can control operation of the host computer system 210 instead of the device 660, and the display 662 can be controlled by the host computer system 210. For example, in this mode, dialing a telephone number on the device's actuator set 663 may result in the personal computer placing a less expensive landline (e.g., POTS or VoIP) call instead of making a mobile telephone call. Note that the user may configure such a mode to operate regardless of whether the mobile device 660 is within range of a radio tower.

Figure 6C:
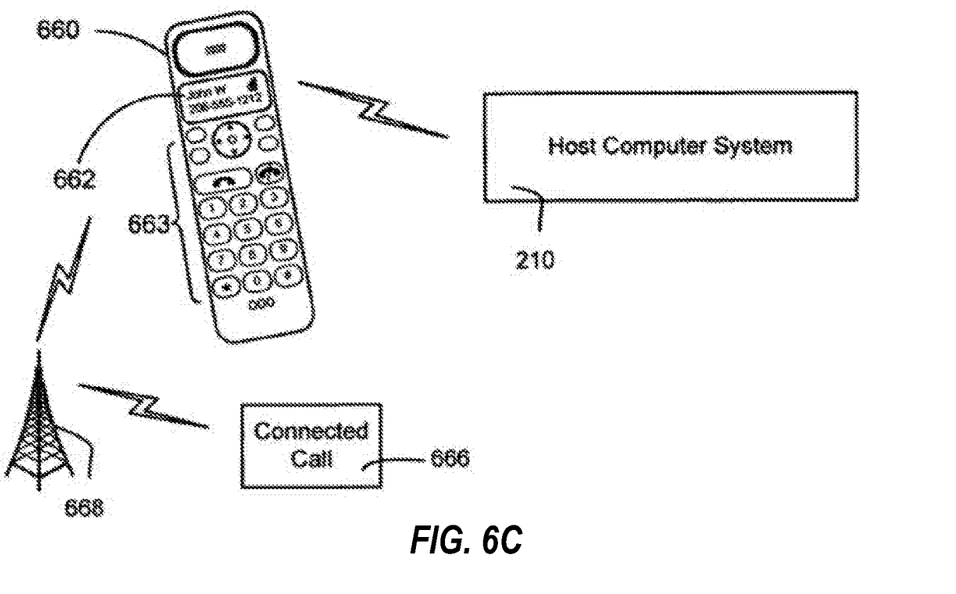

FIG. 6C exemplifies a mode in which the device 660 is coupled to a connected caller/recipient 668 via a tower 668, as well as coupled to the host computer system in some way. Auxiliary device operation may change according to this mode, e.g., the actuator set may remain directed towards mobile phone operation, while the display may change (or not), and another operation such as host-device data synchronization may take place.

Figure 6D:
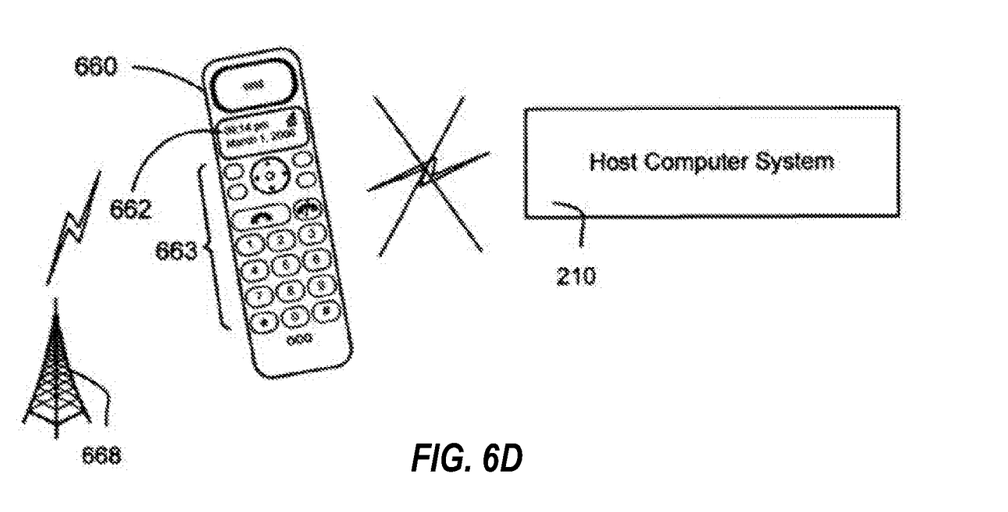

FIG. 6D exemplifies another possible mode in which the device 660 is decoupled from the host computer system 210, but remains in communication with a radio tower 668, regardless of whether also connected to a caller/recipient. In such a mode, the device acts as a conventional mobile phone/wireless data device. However, the device may also be used for display and interaction with cached auxiliary content previously provided by the host computer system 210.

Figure 7A:
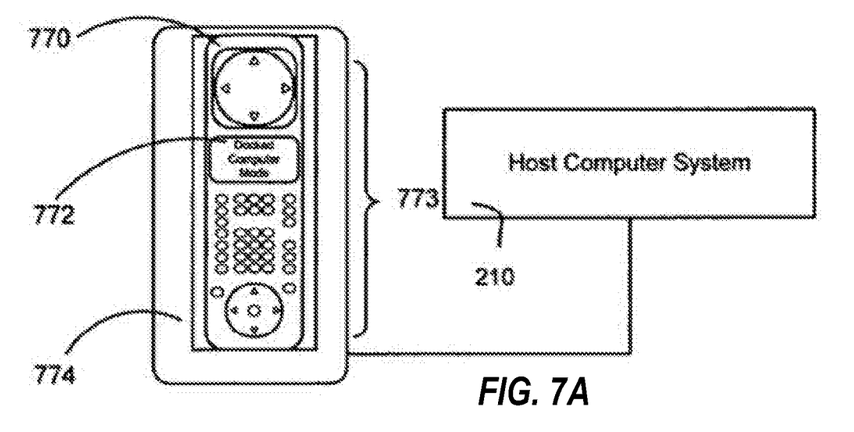
FIGS. 7A-7C are representations of a remote control device that changes auxiliary display and/or actuator functionality based on a current operating state.
Figure 7B:
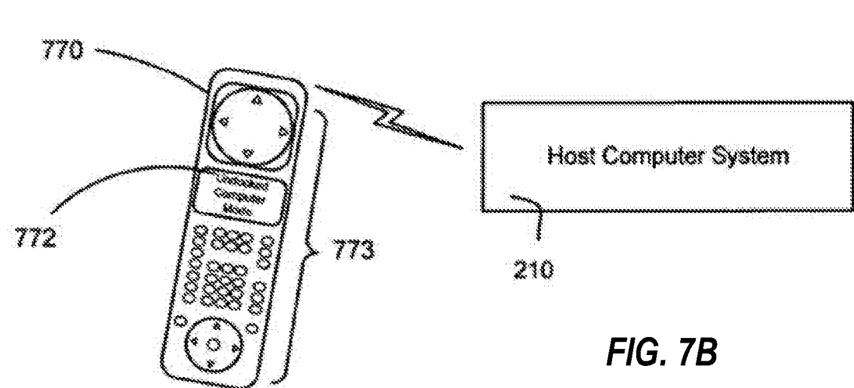
Figure 7C:
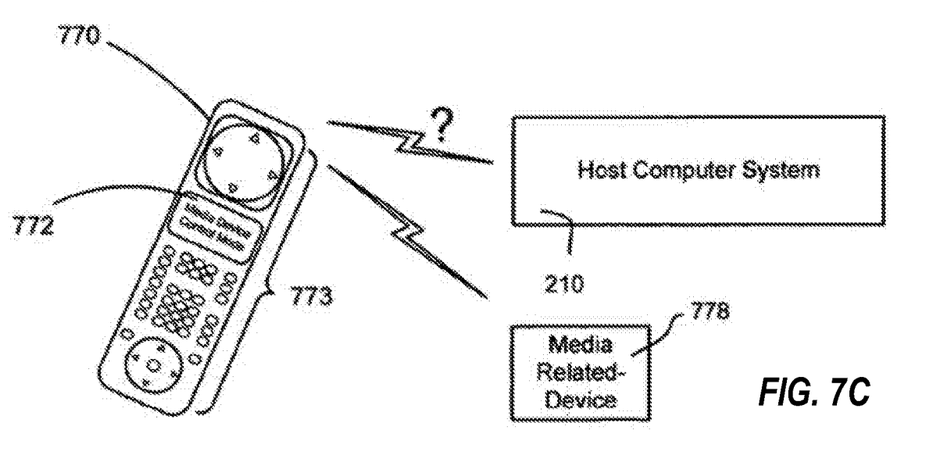

Yet another example is represented in FIGS. 7A-7C, in which a remote control device 770 for a media-related device 778 (e.g., an audiovisual-related device such as a television or audio receiver) or the like may operate differently based on a current state. Note that such a remote control device 770 may control the media device through the host computer, e.g., the host computer system may be configured as a media center, such as via Microsoft Corporation's Windows® Media Center Edition operating system. Such a remote control may be docked in a base 774 coupled to the computer system 210, in which event the display 772 and/or actuator set 773, (or some part of each), may be in a mode in which the host computer system 210 controls the operation.

FIG. 7B shows an undocked state where the device 770 is still communicating with the host computer system 201, which may correspond to a different mode of operation. For example, the device 770 may be set to control a media player via infrared output, but may receive notifications and other data from the computer system. FIG. 7B shows a conventional remote-control operating mode in which the remote control device 770 is controlling a media-related device 778, independent (as represented by the "?" in FIG. 7C) of whether also coupled to the host computer system. For example, such a device 770 may be configured to change a television channel directly on a television receiver without necessarily needing to go through the host computer system 210.

Figure 8A:
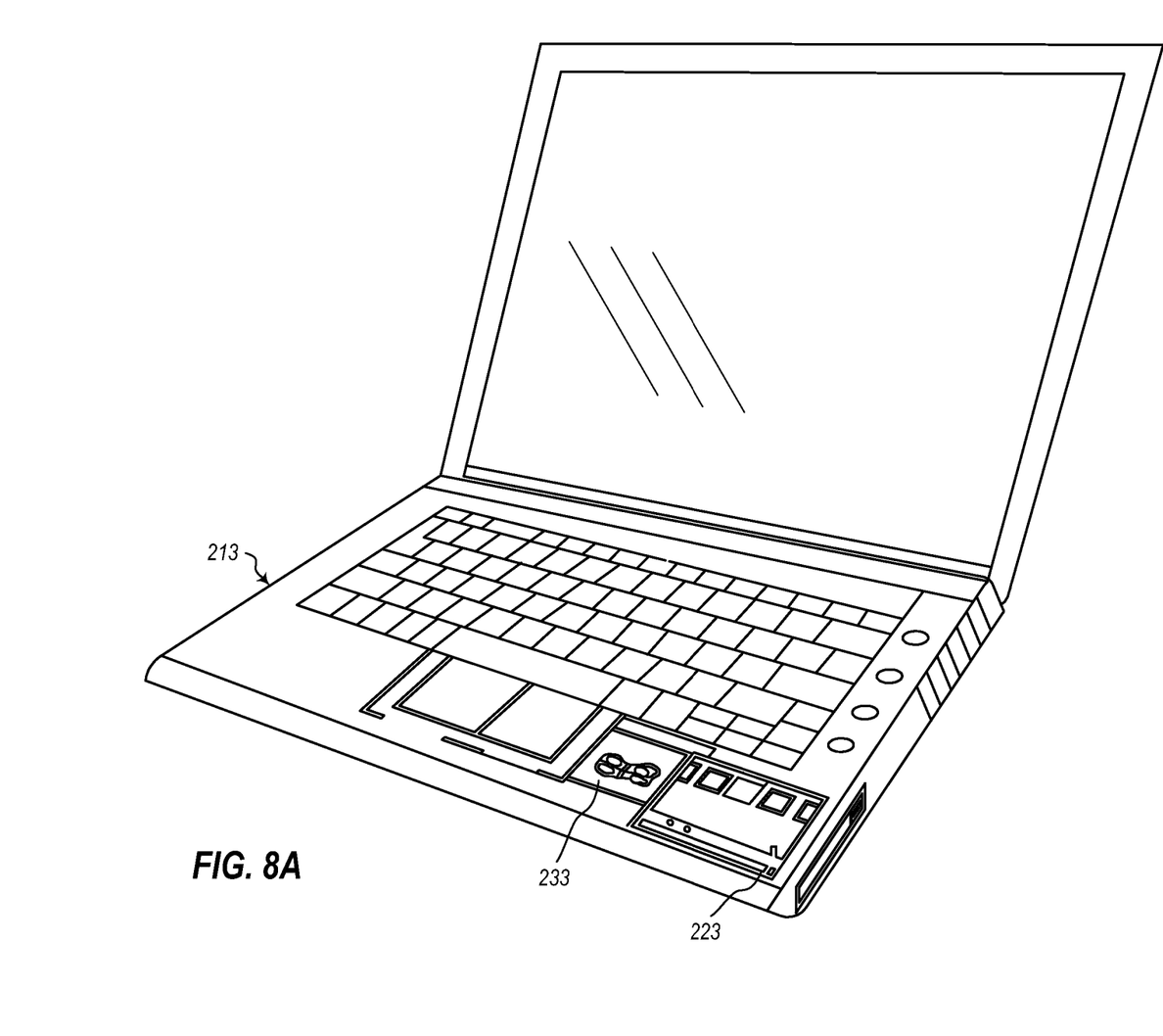
FIGS. 8A and 8B are representations of computer system with a detachable auxiliary display that changes actuator functionality based on a current operating state.
Figure 8B:
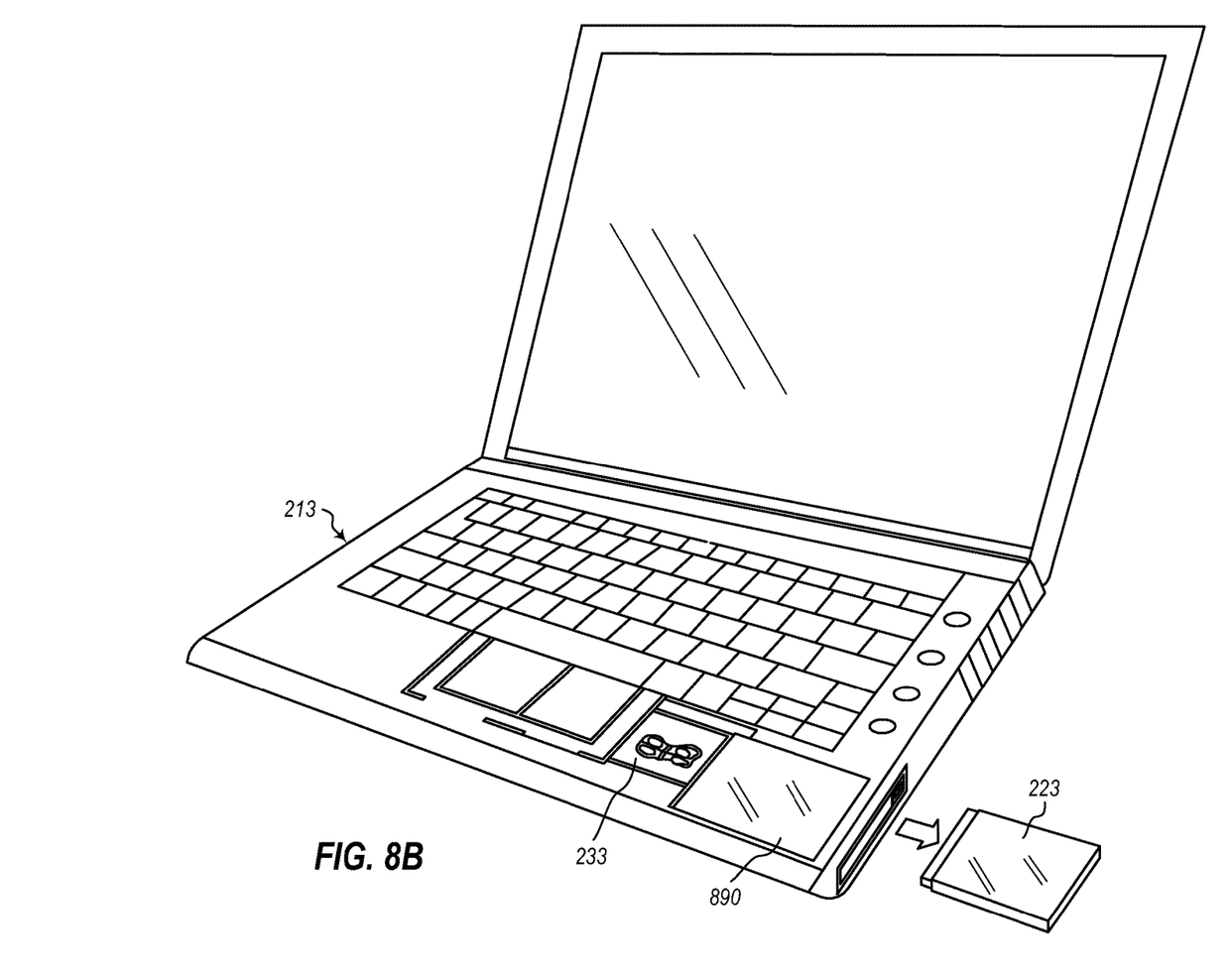

As can be readily appreciated, instead of having an actuator set that accompanies an auxiliary display, an actuator set may be fixed with respect to a host computer system, while the auxiliary display is removable. FIGS. 8A and 8B show one such example, where the actuator set 233 is physically part of the host computer system 213 that may be coupled to a detachable auxiliary display. Note that while FIGS. 8A and 8B exemplify an auxiliary display implemented in the form of a detachable card 223, such as a PCMCIA card or the like that shows through a transparent surface 890 (FIG. 8B) when inserted (FIG. 8A), other display devices such as a wired or wireless (e.g., USB-based) auxiliary display are equivalent.

In such a situation, the operation of the actuator set may change based on whether the auxiliary display is attached or detached. For example, the actuator set 233 may be configured to interact with content rendered on the auxiliary display 223 when it is inserted as in FIG. 8A, or with the operating system of the host computer 213 when the auxiliary display 223 is removed, as in FIG. 8B.

To this end, when the detachable display component (e.g., card) comprises the auxiliary subsystem memory and processing components, input data corresponding to actuator set user input may be provided thereto. In the event the detachable display component is only a display, with the auxiliary subsystem memory and processing components accompanying the actuator set, the display data as modified by the actuator signals may be sent rather than the actuator data.

Note that an auxiliary display may be presented on a subset (e.g., in a window) of a main display of a host computer system. If so, an actuator set can change its effective operating behavior (e.g., where its input is routed) based on whether the auxiliary display is currently being shown or is hidden, minimized or closed.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system comprising:
    a display;
    an actuator set having one or more physical actuators for receiving user input associated with one or more programs installed on the computer system;
    one or more processors; and
    one or more computer-readable hardware storage media having stored computer-executable instructions that are executable by the one or more processors to cause the computer system to:
        determine a mode of connection between the computer system and a separate computer system that the computer system is configured to be docked and undocked from, the mode of connection comprising a state of the computer system being docked or, alternatively, undocked from the separate computer system;
        based on the mode of connection, select a mode of operation for the computer system;
        based on the mode of operation, selectively determine how the one or more programs installed on the computer system are to operate, wherein the one or more programs operate in a first mode when the computer system is docked to the separate computer system and in a second mode when the computer system is undocked from the separate computer system;
        in response to the computer system being docked to the separate computer system, cause the one or more physical actuators of the computer system to transition from initially controlling operation of the computer system to subsequently controlling operation of the separate computer system and additionally cause the display of the computer system to transition from initially being controlled by the computer system to subsequently being controlled by the separate computer system; and
        while a main processing unit of the separate computer system is identified as being in a low power state, use a network interface of the separate computer system to receive a notification from a remote application.

2. The computer system of claim 1, wherein docking of the computer system to the separate computer system is accomplished via a wireless coupling.

3. The computer system of claim 1, wherein docking of the computer system to the separate computer system is accomplished via a wired coupling.

4. The computer system of claim 1, wherein at least one of the computer system and the separate computer system comprises a mobile phone.

5. The computer system of claim 1, wherein the computer system comprises the mobile phone.

6. The computer system of claim 1, wherein the mode of operation for the computer system enables the computer system to control operation of the separate computer system.

7. The computer system of claim 6, wherein the one or more programs comprises a telephony application and wherein the mode of operation for the computer system enables the computer system to control operation of the separate computer system by causing the separate computer system to make a telephone call based on input received at the computer system.

8. The computer system of claim 1, wherein execution of the computer-executable instructions further causes the computer system to change the mode of operation in response to detecting a change in the mode of connection.

9. The computer system of claim 1, wherein execution of the computer-executable instructions further causes the computer system to, based on the mode of operation, selectively determine whether input from the one or more physical actuators is to be directed to the computer system or the separate computer system.

10. The computer system of claim 1, wherein execution of the computer-executable instructions further causes the computer system to, based on the mode of operation, selectively determine whether output is to be provided to the display of the computer system or to a display of the separate computer system.

11. A method implemented by a computer system that includes a display, an actuator set having one or more physical actuators for receiving user input associated with one or more programs installed on the computer system, one or more processors, and one or more computer-readable hardware storage media having stored computer-executable instructions that are executable by the one or more processors to cause the computer system to implement the method, the method comprising:
    determining a mode of connection between the computer system and a separate computer system that the computer system is configured to be docked and undocked from, the mode of connection comprising a state of the computer system being docked or, alternatively undocked from the separate computer system;
    based on the mode of connection, selecting a mode of operation for the computer system;
    based on the mode of operation, selectively determining how the one or more programs installed on the computer system are to operate, wherein the one or more programs operate in a first mode when the computer system is docked to the separate computer system and in a second mode when the computer system is undocked from the separate computer system;
    in response to the computer system being docked to the separate computer system, causing the one or more physical actuators of the computer system to transition from initially controlling operation of the computer system to subsequently controlling operation of the separate computer system and additionally causing the display of the computer system to transition from initially being controlled by the computer system to subsequently being controlled by the separate computer system; and while a main processing unit of the separate computer system is identified as being in a low power state, using a network interface of the separate computer system to receive a notification from a remote application.

12. The method of claim 11, wherein docking of the computer system to the separate computer system is accomplished via a wireless coupling.

13. The method of claim 11, wherein docking of the computer system to the separate computer system is accomplished via a wired coupling.

14. The method of claim 11, wherein the computer system comprises a mobile phone.

15. The method of claim 11, wherein the mode of operation for the computer system enables the computer system to control operation of the separate computer system.

16. The method of claim 15, wherein the one or more programs comprises a telephony application and wherein the mode of operation for the computer system enables the computer system to control operation of the separate computer system by causing the separate computer system to make a telephone call based on input received at the computer system.

17. The method of claim 11, wherein the method further includes changing the mode of operation in response to detecting a change in the mode of connection.

18. The method of claim 17, wherein the change in the mode of connection is detected in response to detecting the computer system is undocked from the separate computer system.

19. The method of claim 11, wherein the method further includes, based on the mode of operation, selectively determining whether input from the one or more actuators is to be directed to the computer system or the separate computer system.

20. The method of claim 11, wherein the method further includes, based on the mode of operation, selectively determining whether output should be provided to the display of the computer system or to a display of the separate computer system.

* * * * *